Patented Dec. 19, 1933

1,940,530

UNITED STATES PATENT OFFICE 1,940,530

ART OF COATING

Ernest M. Brogden, Pomona, Calif., and Miles L. Trowbridge, Syracuse, N. Y., assignors to Brogdex Company, Winter Haven, Fla., a corporation of Florida No Drawing. Application June 5, 1929
Serial No. 368,731

24 Claims. (Cl. 99—8)

This invention relates to the art of coating; and it relates more particularly to the provision on the surface of fresh citrus and other fruit of a thin, waxy coating of such character as to enhance the marketability of the fruit to a material extent.

During the last few years the application to fresh fruit of a waxy material, such as ordinary paraffin wax, in order to provide the fruit with a very thin, film-like, protective surface coating, has been widely practiced by packers of fruit, especially oranges and grapefruit, in accordance with the principles disclosed in the patent to E. M. Brogden No. 1,641,112. Although highly beneficial results have been attained through this general type of treatment in the way of greatly reducing withering and shrinkage of the fruit and protecting it against external infection by decay organisms, it has been found in practice that these results are not always as uniformly dependable as is desirable, especially if the treating process is carried out by operators who are not thoroughly experienced or sufficiently careful. Moreover, however satisfactorily withering is reduced and external infection prevented, it has been found difficult in applying paraffin coatings heretofore to obtain the desired degree and permanency of gloss or polish on the fruit; in fact, the application of paraffin has been found in some cases to give the fruit a dull appearance in spite of thorough rubbing with mechanical brushes. This is especially true with fruit which is not naturally bright or fair in appearance, or which is not smooth skinned.

This matter of shine or polish on fruit is of extreme importance from a marketing standpoint. Of two different lots of fruit of the same grade and quality, that lot which shows the better shine or polish will practically always bring a substantially higher price per box in the market. The desirability of being able not only to protectively coat fruit to reduce shrinkage but also to obtain a good polish that will remain good under practical packing, shipping and marketing conditions, has long been appreciated, and there have been persistent efforts made to achieve this result. However, on account of the numerous and varied factors which must be taken into consideration, including among others the rapidity with which the operation must be conducted in large scale commercial work, the perishability of fresh fruit and the ease with which its rind or skin may be injured mechanically or otherwise, and the fact that the protective coating should in no case be of such character as to seal the fruit perfectly airtight but must always permit some "breathing" or transpiration,—these and many other factors entering into the commercial handling of fresh fruit have greatly complicated the problem and have prevented a satisfactory solution of it heretofore.

A principal object of the present invention is to provide a coating procedure whereby the hereinbefore mentioned objections and disadvantages characterizing the prior art may be overcome or avoided and the fruit may be given a waxy coating which is not only satisfactory from the standpoint of dependable protection but which also enhances the appearance and salability of the fruit. A further object is to improve the character of the waxy coating in certain other respects, such as uniformity, close adherence to the fruit, toughness, and general permanence and resistance to abrasion, or in some one or more of these respects. Further objects and advantages will appear as the description proceeds.

In general, the objects of the invention are attained most desirably by employing as constituents of the coating composition a mixture of two or more waxes, of which at least one is relatively low-melting and at least one is relatively high-melting. Examples of relatively low-melting waxes that are suitable are several of the mineral waxes so-called, such as paraffin, ceresin, and ozocerite; and some non-mineral waxes, such as Japan wax. Among various relatively high-melting waxes that may be employed are carnauba, candelilla, China and Montan waxes. Thus, in the broader aspects of the invention, there is considerable latitude of choice in selecting a combination of waxes for the purposes in view. It is not to be understood, however, that all these different combinations give equally good results or that they are to be regarded as equivalents in that sense. On the contrary, while such combinations in general, if used in accordance with the principles of the invention, enable attainment of results better than those heretofore attainable, it has been found that by employing coating compositions consisting either wholly or in large part of mixed paraffin and carnauba waxes in varying relative proportions, it is possible to attain results and advantages of such outstanding superiority that, for the purposes of the present invention, these paraffin-carnauba compositions are rather sharply distinguishable in point of marked utility from the rest of the general class mentioned. For this reason such compositions will be more particularly referred to hereinafter in further explaining the principles of the invention, but without intending to restrict the invention thereto.

Assuming the use of a coating mixture consisting of or comprising paraffin and carnauba wax, the relative proportions of these constituents may be varied widely while still realizing the benefits of the invention in greater or less degree. Experience in large scale operation of the new process has shown, however, that in coating citrus fruit, at least, employment of carnauba in proportion greater than 25 per cent of the paraffin-carnauba combination or mixture is not only unnecessary but is sometimes less advantageous than where the percentage of carnauba is 25 per cent or less. In fact, according to our experience, a mixture comprising approximately from 5 to 15 per cent carnauba and the remainder paraffin gives particularly good results when properly applied to the fruit, 10 per cent carnauba being considered at present an optimum proportion. Very small additions of carnauba wax to paraffin have a perceptibly beneficial effect on the character of the resultant coating on fruit, and the invention is therefore not limited to any specific minimum percentage of carnauba in such mixtures; but ordinarily at least 1 or 2 per cent of carnauba should be used, and the materially better results attained with 5 to 10 per cent make the use of such larger proportions well worth while. Increasing the percentage of carnauba above 10 or 15 per cent does not usually produce results sufficiently better to warrant the increase in cost. As the percentage of carnauba wax is increased, and especially when it exceeds about 50 per cent, there is a tendency for the film coating on the fruit to be rather harder and more brittle and non-adherent than is desirable, although the use of such large percentages is not to be understood as defeating the purposes of the process. It is even possible to employ carnauba wax without any admixture of paraffin and still obtain a film coating which has desirable properties, including a good shine or polish; but the coating is tougher, adheres better, and in other ways is more satisfactory, when the proportion of paraffin exceeds that of carnauba in the mixture; not to mention the fact that the cost of materials is far less where the paraffin predominates. For practical purposes, therefore, a paraffin-carnauba composition or mixture, in which the percentage of carnauba ranges from around 5 to 15 or 20 per cent, represents what is considered at present to be the best practice. Such mixtures or blends are readily prepared by melting the waxes together in the desired proportions.

The addition of only a very small percentage of carnauba wax to paraffin wax has a surprisingly pronounced effect in raising the melting point. A good commercial grade of paraffin wax ordinarily has a melting point of from 128° to 130° F. A good commercial grade of carnauba wax commonly has a melting point of about 184° F. A mixture of 95 per cent paraffin and 5 per cent carnauba wax melts at 170° F., or only 14° lower than the carnauba wax alone. The following table shows the approximate melting points of various mixtures of carnauba and paraffin waxes:

| Percent carnauba | Percent paraffin | Melting point (° F.) |
|---|---|---|
| 5 | 95 | 170 |
| 10 | 90 | 172 |
| 15 | 85 | 174 |
| 20 | 80 | 174 |
| 25 | 75 | 175 |
| 30 | 70 | 175 |
| 33 | 67 | 176 |
| 40 | 60 | 177 |
| 50 | 50 | 178 |

The foregoing figures will vary somewhat, of course, in accordance with slight variations in the commercial grades of the waxes concerned. The commercial grades of carnauba wax now available on the market, known as No. 1 Yellow and No. 2 North Country, have both been found suitable in practice and they give blends or mixtures with paraffin having melting points substantially as indicated above.

In using these wax mixtures to coat fresh fruit, it is necessary, in order to get the best results, very carefully to coordinate and correlate several important operating conditions in order to obtain uniform distribution of the wax mixture over the surface of the fruit in the thin, film-like coating desired. Two of the most important operating conditions in this connection are, first, the temperature of the immediate atmospheric environment of the fruit during the application and distribution of the wax mixture; and, second, the period or length of time during which the fruit is rubbed or brushed in that environment at the temperature in question to effect uniform distribution. As regards the temperature, this should ordinarily be substantially above the melting point of the wax mixture, especially satisfactory results being obtained when the temperature is quite considerably above such melting point, say as much as 30° to 50° higher. In this way the requisite fluidity of the rather high melting point wax mixture is ensured, with consequent ability to spread the mixture more uniformly and perfectly over the fruit surface into a film coating of the extreme thinness necessary to avoid interfering too much with the breathing or transpiration of the fruit. The rubbing, brushing or other frictional action by which the distribution is accomplished should be continued briskly for a substantial period of time, ordinarily at least about 5 to 10 seconds. A longer period, say 15 to 25 seconds, gives distinctly better results and is to be recommended in practice. A rubbing period of about 20 to 25 seconds where revolving horsehair brushing rolls are employed is very satisfactory. Another important operating condition or factor is careful regulation and control of the amount of waxy coating material applied to each fruit, whereby enough is applied to reduce withering to the lowest safe minimum but not so much as to smother the fruit.

The considerably higher melting and solidifying points of the waxy coating material here employed, as compared with those of paraffin, make the problem of securing uniform distribution as a film coating of extreme thinness a difficult matter. But without such uniformity, protection against withering is inadequate; while too thick a coating, however uniform, produces fermentation and rapidly renders the fruit uncommercial. For obvious practical reasons, the skin or rind of the fruit is necessarily many degrees cooler than the molten high-melting waxy material applied to it. Fresh fruit, in order to be marketable as such, must not be exposed to heat in such manner as to impair its freshness by cooking or scalding, nor may the skin of the fruit be injured; and to bring the outer surface of the fruit to a temperature much higher than about 110° to 120° F. without overheating the body of the fruit or injuring the skin is not feasible. Therefore, in the use of the relatively high-melting waxy materials here in question, the pronounced tendency of the molten material to congeal instantly upon contact with the much cooler surface of the fruit and thereby to become difficult to spread uniformly or with the requisite degree of thinness presents a substantial difficulty which, however, is overcome by proper coordination and correlation of the operating conditions, including those above discussed, as will further hereinafter appear. The aforesaid difficulty of securing uniform spreading could be overcome by employing a solvent or compatible oily vehicle in mixture with the waxy material; but it has been found that the presence of such solvent or vehicle when the waxy coating is being rubbed or brushed greatly reduces the shine or polish obtained and is therefore less desirable. By employing a volatile solvent and re-burnishing the initially applied coating after the solvent has largely evaporated, it is possible to obtain a good polish on the fruit; but such a procedure is much more complicated, besides being open to certain objections inherent in the use of a volatile solvent.

The operations of applying and distributing the waxy mixture over the surface of the fruit may be carried out in various types of apparatus. For example, apparatus like that shown in the aforesaid patent to Brogden No. 1,641,112 may be used for the purpose. Better results are obtained, however, where the rubbing or brushing unit is of the type disclosed in the Brogden Patent No. 1,671,924, comprising parallel rotary brush rolls between which travels longitudinally an endless flexible brush element driven at a speed adjustable independently of the speed of the brush rolls. Such an arrangement has the particular advantage of permitting the speed of the travel of the fruit through the brush runways to be positively controlled, thus enabling accurate regulation of the period of time during which the fruit is brushed after application of the waxy mixture. The necessary small amount of waxy material may be applied in fluid condition by spraying it on the fruit just as it enters the brushing unit. Any suitable spraying device may be used for this purpose, as, for example, a type operated by preheated compressed air and adapted to be regulated in such manner that the amount of molten waxy material directed upon the fruit entering the brush unit may be accurately adjusted and controlled. Suitably heat-insulated housing means should enclose the brushing unit, and appropriate electrical or other heating means should be located therein to maintain the desired temperature at which the brushing or rubbing operation is to be conducted. Thermostat control means of any usual or suitable type may also be desirably provided for automatic regulation or control of the temperature within the housing.

In a typical example illustrating how the new process may advantageously be carried out in practice, it will be assumed that the coating material employed is a mixture consisting of 90% paraffin and 10% carnauba wax, by weight. This mixture is maintained in freely fluid molten condition in the heated supply tank or reservoir of the spray device and is sprayed or jetted through atomizing or spray nozzles down upon the fruit just as the latter has begun to travel along the revolving brushes of the brushing unit, air under about 2 to 4 pounds pressure and preheated to about 200° to 300° F. being employed to operate the spray nozzles. The rotary brushes of the brushing machine, which are ordinarily about 10 inches in diameter measured to the tips of the horsehair bristles, are desirably driven at about 175 R. P. M. and may be about 20 feet long in a typical instance. The arrangement and mode of operation are such that the fruit remains in the brushing machine for, say, 20 seconds after it receives the small quantity of finely sprayed or atomized molten waxy mixture initially jetted upon it by the spray device at the feeding-in end of the brushing machine; and during all this time it is subjected to the temperature maintained within the machine housing which is desirably at from 200° to 220° F. observed at a point close to the rotating brushes, say within 1 or 1½ inches from the brushing surfaces thereof.

The spray device employed may desirably be of a type which not only jets a fine mist-like spray of the melted waxy material directly upon the fruit as it enters the brushing machine but also produces a floating mist or fog of the hot waxy material which fills practically the entire housing surrounding the brushes and thus continually contacts with the surface of the oranges or other fruit as the fruit turns first upon one axis and then upon another in traveling down the brush runways bathed with air at a temperature above the melting point of the wax mixture. Thus, in spite of the fact that there is probably some initial congelation of waxy material on the cooler surface of the fruit, the prolonged rubbing of the fruit on the brushes and in contact with hot air carrying a fog or mist of molten wax has the effect of softening the small quantity initially congealing on the fruit and rendering it fluid or spreadable to such an extent that, by the action of the brushes, it is distributed all over the skin of the fruit in a film coating of extreme thinness and remarkable uniformity.

The amount of waxy material thus applied to and distributed over the surface of the fruit may vary considerably within the scope of the invention; but in treating oranges, for example, under the specific conditions set forth in this illustrative example, best results are achieved when a quantity equal to about 2 pounds of the paraffin-carnauba mixture is discharged through the sprayer or atomizer nozzles for each 100 standard boxes of oranges going through the brushing machine. This figures between about 9 and 10 pounds per standard California car of 462 boxes. This amount, which may be taken as a good working average, includes some unavoidable wastage of wax in the course of the applying and spreading operations; but with properly designed apparatus and well controlled operation, this loss is very slight, probably not amounting usually to more than around 10 per cent, so that the amount of waxy mixture above specified approximates rather closely what is actually present on the fruit when the coating operation is completed.

As the fruit is discharged from the rubbing or brushing unit, the relatively high-melting waxy coating on the fruit congeals and becomes hard quickly in the much cooler temperature of the air, even in summer, and much more quickly than does paraffin alone; and in thus rapidly congealing it retains the excellent shine or polish given it by the rotary brushes. It is found that this polish or lustre remains substantially unimpaired for weeks or even months, and in any case amply long to cover the usual marketing period. Also, the coating is found to be relatively tough and not easily injured or broken, to be tenaciously adherent to the skin of the fruit, and yet to be so extremely thin that fruit thus coated may be kept for weeks or even months without developing rancidity or other undesirable flavor, showing that the coating thus applied, although highly efficient in reducing withering, is nevertheless slightly permeable by air and other gases and therefore does not interfere with the breathing or transpiration of the fruit to an undesirable extent. In other words, the fruit is not sealed air-tight.

The effectiveness of the protection thus afforded against withering and shrinkage has been fully established in practice. When fruit is treated as described in the foregoing specific illustrative example, the loss in weight during the first ten days after treatment, assuming the fruit to be maintained exposed to the atmosphere at ordinary summer temperatures and a humidity of around 70% of saturation, is usually found to average in the neighborhood of 2%, which is ordinarily about as far as it is safe to carry the reduction in withering in view of the necessity for avoiding too much interference with the breathing or transpiration of the fruit. This compares with a normal average loss of about 5% to 6% in weight by uncoated oranges of exactly the same character maintained under exactly the same conditions for the same period. A loss of 2% in the weight of an orange is not perceptible to the eye; and in the case of fruit coated as herein described and left exposed to ordinary atmospheric conditions, there is usually no visually perceptible withering for at least twenty to thirty days after treatment, the fruit often remaining firm and plump for even considerably longer periods of time. Uncoated fruit kept under the same conditions is visibly withered within a week or ten days; and at the end of twenty to twenty-five days the withering is ordinarily so pronounced as to render the fruit commercially valueless. Fruit protectively coated in accordance with the principles of the invention can be shipped under ventilation at all seasons of the year, without pre-cooling or refrigeration.

Before being coated with waxy material in the manner above described, the oranges or other fruit in question may have undergone, and ordinarily will have undergone, a preceding washing and cleansing treatment which may or may not include chemical treatment for retarding blue mold and other forms of decay. In fact, in the best present modern practice as developed by the present applicants, a preceding treatment with an alkaline mold retarding agent before application of the waxy coating is practically always employed. Such retarding agent is most desirably borax (see patent to Brogden and Trowbridge No. 1,529,461). Sodium carbonate (soda ash) or other comparatively strong alkali, such as caustic soda (sodium hydroxide), may also be made use of for this purpose under proper conditions. The employment of such a preceding alkaline treatment has special advantages in connection with the present invention, not only because of the protection thereby afforded against blue mold decay and the like but also because the small amount of alkaline material left on the surface of the fruit as a result thereof has a desirable effect upon the character of a waxy coating of the composition herein disclosed. It is to be noted that the waxy coating here in question is always characterized by a greater or less content of saponifiable material. For example, in the paraffin-carnauba mixtures which are more particularly recommended herein, the carnauba wax is saponifiable to a substantial extent, in contrast to the substantially unsaponifiable mineral paraffin wax consisting substantially wholly of hydrocarbons. In the operation of rubbing the fruit for anywhere from 10 to 30 seconds after initial application of the paraffin-carnauba mixture in an environment heated to a temperature approximating the boiling point of water, it is probable that there is some reaction between the alkaline material on the surface of the fruit and the saponifiable constituents of the waxy coating. At any rate, the superior character of the finished coating has been fully demonstrated in actual practice, and it is believed that its tenacious adherence to the skin of the fruit and the uniformity of this adherence over every portion of the skin is due at least in part to an intimacy of contact brought about to an appreciable extent by something in the nature of a saponifying reaction between the alkaline agent and the waxy material. This is considered to be an important feature of the invention and is believed to be broadly novel.

As has been pointed out above, while carnauba wax is deemed particularly desirable to use in carrying out the novel process herein disclosed, other relatively high-melting waxes are susceptible of use in this connection. Candelilla wax is one of these. As obtainable commercially it usually has a melting point of about 163° F. and may be readily blended with various proportions of paraffin to give a coating composition which, when applied in molten condition to oranges or other fresh fruit, gives a coating which not only affords excellent protection against withering but also has a considerably higher and more permanent gloss or polish than can be obtained with paraffin alone. Typical mixtures of candelilla wax and paraffin which may be employed are given in the following table, together with their melting points:

| Per cent candelilla | Per cent paraffin | Melting point (°F.) |
| --- | --- | --- |
| 15 | 85 | 142 |
| 25 | 75 | 146 |
| 33 | 67 | 150 |
| 50 | 50 | 154 |

Owing to a resinous constituent of ordinary candelilla wax, a film coating of a mixture thereof with paraffin on fruit sometimes exhibits a slight tendency toward tackiness, especially where the higher percentages of candelilla wax are employed. By elimination of this resinous constituent through appropriate refining treatment this objection may be obviated.

Montan wax is another relatively high-melting wax whose use in the present process is feasible. A mixture of 10% Montan wax and 90% paraffin melts at 164° F.; while a mixture of 25% of Montan wax and 75% of paraffin melts at 168° F. Such mixtures may be used within the scope of the invention, but they are not considered so desirable as the paraffin-carnauba mixtures described above. In other typical instances, the low-melting softening ingredient lending flexibility and spreadability to the blend may consist of Japan wax, or a mixture of Japan wax and paraffin wax, instead of paraffin alone; while the relatively high-melting ingredient may consist of China wax, or a mixture of China and carnauba waxes, instead of carnauba wax alone. Numerous variations in composition along these general lines, as well as in specific mode of application, are permissible within the scope of the invention which, in its broader aspects, is to be understood as not limited to the details hereinabove given by way of explanatory examples.

It is to be understood that in the compositions mentioned above, the percentages specified are by weight.

While the greatest present utility of the invention is in the treatment of citrus fruit such as oranges, grapefruit, lemons, tangerines, as well as apples, pears, and the like, the term fruit as herein employed is to be understood broadly as including not only fruit commonly so-called, but also vegetables, such as tomatoes or the like, that can be treated to advantage in accordance with the principles of the invention herein set forth.

What is claimed is:

1. The process of surface coating fresh fruit in preparation for market, which comprises applying to the surface of the fruit a molten substantially non-resinous mixture comprising a relatively low-melting wax and a wax of substantially higher melting point, said mixture being substantially free of non-volatile oil, and rubbing the fruit in a heated environment until the mixture is spread substantially uniformly over the surface in a film-like coating.

2. The process of surface coating fresh fruit in preparation for market, which comprises applying to the surface of the fruit a molten substantially non-resinous mixture comprising paraffin and carnauba wax, and rubbing the fruit in a heated environment until the mixture is spread substantially uniformly over the surface in a film-like coating.

3. The process of surface coating fresh fruit in preparation for market, which comprises applying to the surface of the fruit a molten substantially non-resinous mixture comprising paraffin and carnauba wax, the carnauba wax constituting not more than about 25 per cent of the mixed wax materials, and rubbing the fruit in a heated environment until the mixture is spread substantially uniformly over the surface in a film-like coating.

4. The process of surface coating fresh fruit in preparation for market, which comprises applying to the surface of the fruit a molten substantially non-resinous mixture comprising paraffin and carnauba wax, the carnauba wax constituting from 1 to 15 per cent of the mixed wax materials, and rubbing the fruit in a heated environment until the mixture is spread substantially uniformly over the surface in a film-like coating.

5. The process of surface coating fresh fruit in preparation for market, which comprises spreading over the surface of the fruit a molten substantially non-resinous mixture comprising a mineral waxy material, such as paraffin, and a non-mineral waxy material, such as carnauba, said mixture being substantially free of non-volatile oil, the quantity of said mixture employed being so limited and the spreading so effected as to produce a film-like coating insufficiently thick to stop transpiration.

6. The process of surface coating fresh fruit in preparation for market, which comprises applying thereto a small quantity of a molten substantially non-resinous waxy mixture comprising a major proportion of a mineral wax and a minor proportion of a higher-melting non-mineral wax, said mixture being substantially free of non-volatile oil, and rubbing in a heated environment for at least 5 to 10 seconds to distribute the mixture substantially uniformly over the surface in a film-like coating.

7. The process of surface coating fresh fruit in preparation for market, which comprises applying thereto a small quantity of a molten substantially non-resinous waxy mixture comprising a major proportion of paraffin and a minor proportion of carnauba wax, and rubbing in a heated environment for at least 5 to 10 seconds, to distribute the mixture substantially uniformly over the surface in a film-like coating.

8. The process of surface coating fresh citrus or other fruit in preparation for market, which comprises applying to the fruit a molten substantially non-resinous mixture of paraffin and carnauba waxes, the carnauba wax constituting from about 5 to 15 per cent of the mixture, and rubbing the fruit in a heated environment until the waxy mixture is distributed over the surface of the fruit in a protective film-like coating adequate to reduce withering of the fruit substantially but somewhat permeable by air or other gas.

9. The process as defined in claim 8, further characterized by the fact that said heated environment is maintained at a temperature of at least about 170° F. but not sufficiently high to injure the fruit.

10. The process as defined in claim 8, further characterized by the fact that said heated environment is maintained at a temperature of at least about 170° F. but not sufficiently high to injure the fruit, and that the rubbing of the fruit is continued for at least about 10 seconds.

11. The process as defined in claim 8, further characterized by the fact that said heated environment is maintained at a temperature of about 170° to 220° F.

12. The process as defined in claim 8, further characterized by the fact that said heated environment is maintained at a temperature of about 200° to 220° F.

13. The process of surface coating fresh citrus or other fruit in preparation for market, which comprises applying to the fruit a molten blend or mixture of a relatively low-melting mineral waxy protective material and a non-mineral waxy protective material of substantially higher melting point, and rubbing the fruit in a heated environment until the mixture is spread substantially uniformly over the surface in a film-like coating, said mixture being substantially free of non-volatile oil and having a melting point above about 142° F.

14. The process as defined in claim 13, further characterized by the fact that the higher melting component of the mixture is hard and brittle at ordinary atmospheric temperatures.

15. The process as defined in claim 13, further characterized by the fact that the higher melting component of the mixture is hard and brittle at ordinary atmospheric temperatures, and that said heated environment is maintained at a temperature approximately 30° to 50° F. higher than the melting point of said mixture.

16. In the preparation of fresh fruit for market, the process which comprises subjecting the surface of the fruit to an alkaline treatment by which an alkaline residue is left thereon, and then spreading thereover in fluent condition a thin coating of waxy protective material which is saponifiable at least to some extent by said alkaline residue under the conditions of operation and which is substantially solid at ordinary atmospheric temperatures.

17. In the preparation of fresh fruit for market, the process which comprises subjecting the surface of the fruit to an alkaline treatment, and then spreading thereover a thin coating of a mixture of mineral and non-mineral waxy material with the aid of heat and friction at a temperature sufficiently high to render the mixture substantially fluid, said mixture being substantially solid at ordinary atmospheric temperatures.

18. In the preparation of fresh fruit for market, the process which comprises subjecting the surface of the fruit to an alkaline treatment, and then spreading thereover a thin coating of a mixture of paraffin and a vegetable waxy material of substantially higher melting point with the aid of heat and friction at a temperature exceeding the melting point of the mixture.

19. In the preparation of fresh fruit for market, the process which comprises subjecting the surface of the fruit to an alkaline treatment, and then spreading thereover a thin coating of a molten mixture of paraffin and carnauba wax, with the aid of heat and friction, the paraffin being in preponderating proportion.

20. In the preparation of fresh fruit for market, the process which comprises subjecting the surface of the fruit to an alkaline treatment by which an alkaline residue is left thereon, and then spreading thereover a thin coating of waxy protective material comprising a component which is saponifiable at least to some extent and which is hard and brittle at ordinary atmospheric temperatures, the spreading operation being effected by rubbing the fruit at a temperature above the melting point of the mixture until an adherent film-like coating is obtained.

21. In the preparation of fresh fruit for market, the process which comprises depositing upon the surface of fresh fruit a small quantity of an alkaline substance, then distributing over the fruit in a thin film a small quantity of hot waxy material having a saponifiable component and maintaining the fruit for a substantial period of time in a heated atmosphere while brushing it thoroughly.

22. In the preparation of fresh fruit for market, the process which comprises depositing upon the surface of fresh fruit a small quantity of an alkaline substance, then distributing over the fruit in a thin film a small quantity of hot waxy material comprising carnauba wax and maintaining the fruit for at least about 5 seconds in a heated atmosphere while brushing it thoroughly.

23. In the preparation of fresh fruit for market, the process which comprises depositing upon the surface of fresh fruit a small quantity of an alkaline substance, then distributing over the fruit in a thin film a small quantity of hot waxy material comprising paraffin wax with which has been mixed carnauba wax in quantity sufficient to constitute between 1 and 15 per cent of the mixture, and brushing the fruit for at least about 5 seconds in an atmosphere maintained at a temperature of at least about 170° F.

24. In the preparation of fresh fruit for market, the process which comprises atomizing molten waxy material comprising carnauba wax and paraffin with the aid of compressed air heated to a temperature of at least about 200° F., passing fresh fruit quickly through a jet of the atomized waxy material, and brushing the fruit for at least 5 to 10 seconds in an atmosphere maintained at approximately 200° to 220° F. and containing a fog or mist of the atomized waxy material.

ERNEST M. BROGDEN.
MILES L. TROWBRIDGE.